US010841879B2

(12) United States Patent
Harrington

(10) Patent No.: US 10,841,879 B2
(45) Date of Patent: Nov. 17, 2020

(54) USER TERMINAL POWER SAVINGS AND INTELLIGENT WAKE SYSTEM

(71) Applicant: Hughes Network Systems, Germantown, MD (US)

(72) Inventor: Emanuel Harrington, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 16/235,146

(22) Filed: Dec. 28, 2018

(65) Prior Publication Data

US 2020/0213945 A1 Jul. 2, 2020

(51) Int. Cl.
*H04W 52/02* (2009.01)
*H04B 7/155* (2006.01)
*H04W 84/12* (2009.01)

(52) U.S. Cl.
CPC ........ *H04W 52/0229* (2013.01); *H04B 7/155* (2013.01); *H04W 52/0235* (2013.01); *H04W 84/12* (2013.01)

(58) Field of Classification Search
CPC . H04W 88/06; H04W 52/0209; H04W 84/12; H04W 52/0229; H04W 52/0261; H04W 52/0225; H04W 52/0274; H04W 52/028; H04W 52/02; H04W 52/0219; H04W 52/0245; H04W 52/0235; H04B 7/155
See application file for complete search history.

(56) References Cited

U.S. PATENT DOCUMENTS

| 7,468,927 | B1 * | 12/2008 | Battista | G01S 5/0027 365/191 |
| 7,539,520 | B2 * | 5/2009 | Twitchell, Jr. | H04W 76/20 455/574 |
| 10,420,022 | B1 * | 9/2019 | Govindassamy | H04W 52/0229 |
| 2012/0266003 | A1 * | 10/2012 | Hutchinson | H04N 5/4401 713/320 |
| 2014/0098723 | A1 * | 4/2014 | Battista | H04B 7/18528 370/311 |
| 2014/0274225 | A1 * | 9/2014 | Lacatus | H04W 52/0241 455/574 |
| 2014/0370878 | A1 * | 12/2014 | Marshall | H04W 52/0274 455/419 |
| 2015/0128203 | A1 * | 5/2015 | Hoang | H04N 21/4131 725/153 |

(Continued)

*Primary Examiner* — Michael J Moore, Jr.
(74) *Attorney, Agent, or Firm* — Global IP Counselors, LLP

(57) ABSTRACT

A user terminal includes a WiFi card and a communications card. The WiFi card includes a first electronic controller, an antenna in communication with the first electronic controller, the antenna of the WiFi card configured to receive a signal from a remote device. The communications card includes a second electronic controller, a connector configured to connect to an external communications device, and a power switch in communication with the second electronic controller and the connector, the second electronic controller configured to control the power switch to enable or disable power through the connector upon receiving instructions from the first electronic controller, based on the signal received by the antenna of the WiFi card.

16 Claims, 14 Drawing Sheets

(56) References Cited

U.S. PATENT DOCUMENTS

| | | | |
|---|---|---|---|
| 2015/0163743 A1* | 6/2015 | Narasimha | H04W 52/0254 |
| | | | 370/311 |
| 2016/0183192 A1* | 6/2016 | Kang | H04W 52/0254 |
| | | | 370/311 |
| 2016/0366638 A1* | 12/2016 | Kumar | H04W 52/0206 |
| 2017/0094601 A1* | 3/2017 | Hardt | H04L 12/12 |
| 2017/0108912 A1* | 4/2017 | Li | G06F 11/3024 |
| 2017/0133843 A1* | 5/2017 | McNeill-McCallum | |
| | | | H02J 9/005 |
| 2017/0302777 A1* | 10/2017 | Harrington | H04B 7/15528 |
| 2018/0042065 A1* | 2/2018 | Jackson | H04W 16/26 |
| 2018/0049126 A1* | 2/2018 | Cheng | H04W 52/0245 |

* cited by examiner

USER TERMINAL POWER SAVINGS AND INTELLIGENT WAKE SYSTEM

BACKGROUND

Field of the Invention

The present invention relates to a user terminal. In particular, the present invention relates to a user terminal with a WiFi portal that is capable of entering a power savings mode and has an intelligent wake system.

Background Information

Conventional user terminals can be in a constant wake or usage condition. As can be understood, with regard to satellite terminals, these types of terminals can consume a predetermined amount of power based on transmit duty cycles. Satellite terminal power cycles are usually segmented into idle and transmitting, with transmitting consuming a considerable amount of more power. However, the idle state of a satellite terminal can still consume a considerable amount of power even when not being used. Prior power savings technology required a user to manipulate a mouse or keyboard to wake the user terminal or put the user terminal to sleep.

SUMMARY

It has been discovered that a more efficient manner in power reduction and operation of a user terminal is desired. In view of the state of the known technology, one aspect of the present disclosure is to provide a user terminal including a WiFi card and a communications card. The WiFi card includes a first electronic controller, an antenna in communication with the first electronic controller, the antenna of the WiFi card configured to receive a signal from a remote device. The communications card includes a second electronic controller, a connector configured to connect to an external communications device, and a power switch in communication with the second electronic controller and the connector, the second electronic controller configured to control the power switch to enable or disable power through the connector upon receiving instructions from the first electronic controller, based on the signal received by the antenna of the WiFi card.

Another aspect of the present disclosure is to provide a method of reducing power consumption of a user terminal, comprising receiving a signal with an antenna of a WiFi card, transmitting the signal to a first electronic controller of the WiFi card, transmitting the signal from the first electronic controller to a second electronic controller of a communication card, and instructing a power switch of the communications card, via the second electronic controller to disable or enable communication through a connector configured to connect to an external communications device, upon receiving instructions from the second electronic controller.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-5, a user terminal 10 in operation with a satellite communication network 12 is illustrated in accordance with an embodiment. As can be understood, the user terminal 10 is a wireless or wired user terminal 10 that connects to an external communication device. That is, the user terminal 10 can connect to remote devices or terminals via a wireless signal or directly by a wire. When connected to a remote device wirelessly, the user terminal 10 can use WiFi or any other suitable wireless communications. When using WiFi, the user terminal 10 can operate using the 802.11 standard using several distinct radio frequency ranges for use in WiFi communications: 900 MHz, 2.4 GHz, 3.6 GHz, 4.9 GHz, 5 GHz, 5.9 GHz and 60 GHz bands. Each range can be divided into a multitude of channels.

Moreover, the user terminal 10 can also include or be connected to an external communication device, such as an antenna dish 30. Accordingly, as can be understood, the user terminal 10 enables communications between a terminal or remote device (such as a smart phone, a tablet, a computer, a television, a server, a printer, a storage device or any other suitable device) and a communications system connected to the internet, the cloud, a television or cable provider or any other information or data transfer system or device using wireless or wired communications.

Figure 1:
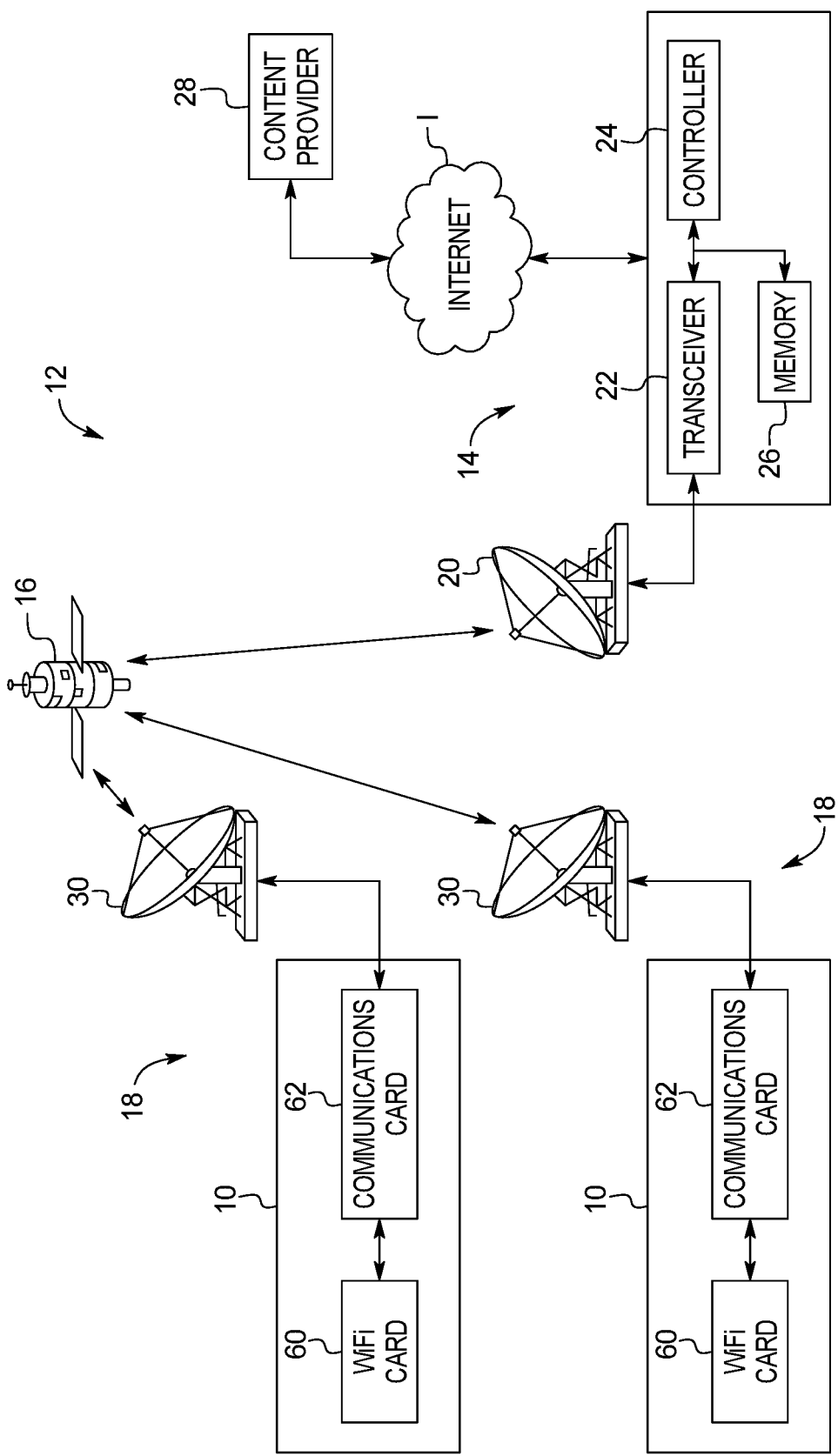
FIG. 1 illustrates an example of a satellite communication network connected to a user terminal according to a disclosed embodiment.
Figure 2:
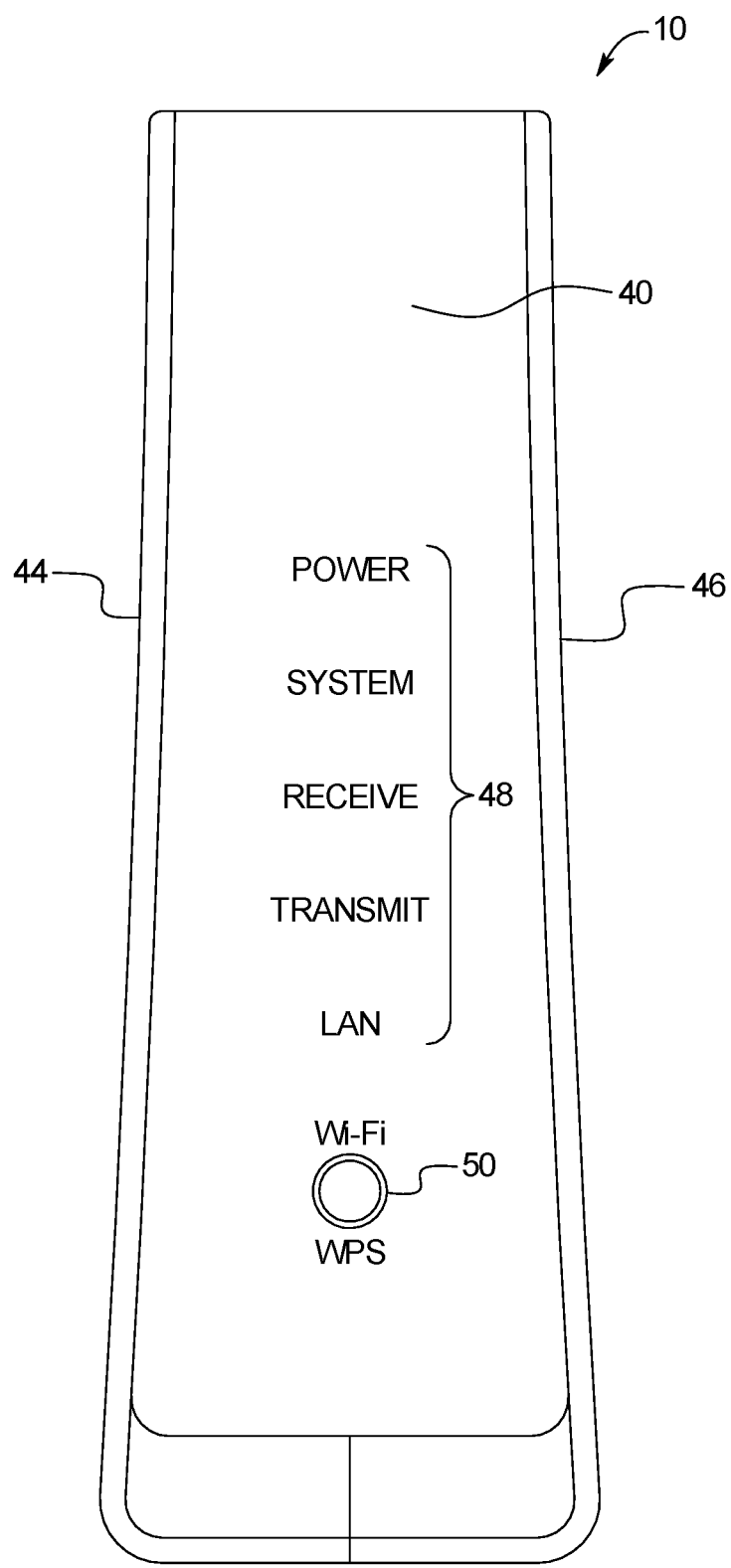
FIG. 2 is a front view of a user terminal according to an embodiment of the present invention.
Figure 3:
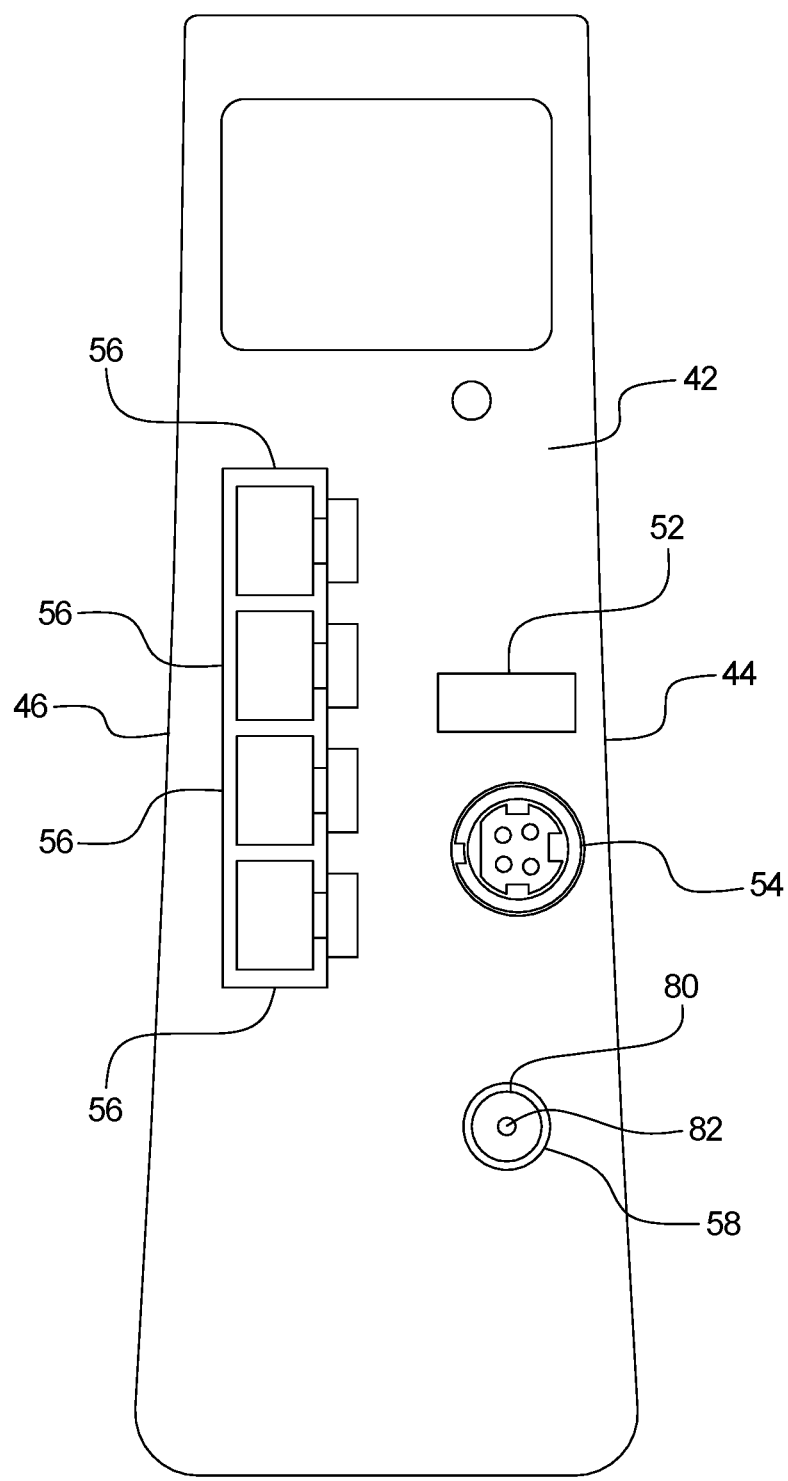
FIG. 3 is a rear view of the user terminal of FIG. 2.

In this embodiment, as will be described herein, the user terminal 10 is a satellite user terminal that is part of the satellite communication network 12. The user terminal 10 in operation with the satellite communication network 12 is shown in FIG. 1. The satellite communication network 12 typically includes a plurality of terrestrially mounted gateways 14 that communicate with one or more orbiting satellites 16, which in turn are in communication with a plurality of (satellite) terminals 18. However, it is noted that the user terminal 10 can be connected to any suitable device or system.

Each satellite gateway 14 includes an antenna dish 20, a transceiver 22, a controller 24, a memory 26 and other types of equipment (not shown) such as amplifiers, waveguides and so on as understood in the art on which enable communication between the gateway and a plurality of satellite terminals 18 via one or more of the orbiting satellites. The memory 26 can be, for example, an internal memory in the gateway 14, or other type of memory devices such as flash memory or hard drives with external high speed interface such as a USB bus or an SATA bus, or remote memories such as cloud storage and so on. These other types of memory can be present at the gateway 14 or accessible at a location apart from the gateway 14 via a network connection such as an Ethernet connection, a WiFi connection or any other suitable type of connection as understood in the art.

The gateway 14, satellites 16 and satellite terminals 18 typically communicate with each other over a radio frequency link, such as a Ku-band link, a Ka-band link or any other suitable type of link as understood in the art. Also, one or more of the gateways can be configured as a network management center or network operating center which, among other things, operate to communicate with remote sites, such as web content providers 28, via the Internet I, cloud storage, or other communication networks as understood in the art. In addition, the gateways 14 can communicate with each other via, for example, the Internet or other communication networks.

In this embodiment, the satellite terminal 18 includes, the user terminal 10 and an antenna dish 30 satellite terminal satellite terminal satellite terminal The antenna dish 30 is connected, generally via acoax cable to the user terminal 10 that is disposed within a house, building or other facility or area to produce a WiFi network. As shown in FIGS. 2-5, the user terminal 10 includes a front side 40, a rear side 42, a left side 44 and a right side 46. The front side 40 includes indicator lights 48 that indicate the status or condition of the user terminal 10. For example, the lights 48 can indicate whether the user terminal 10 is receiving power, transmitting, receiving, signal strength, the LAN condition and any other suitable condition. Additionally, the front side 40 can include a WiFi protected setup (WPS) button 50 or any other suitable buttons or indicators desired.

The rear side 42 of the user terminal 10 can include a USB connector 52, a power connector 54, LAN connectors 56 and a connector 58 (e.g., a satellite (SAT) connector), as is known in the art. Thus, as can be understood, the USB and LAN connections 52, 56 enable the user terminal 10 to directly connect (through wires) to any desired remote device RD, while the SAT connector 58 directly connects to an antenna dish 30. However, the user terminal 10 can include any suitable connections for any suitable devices.

Figure 4:
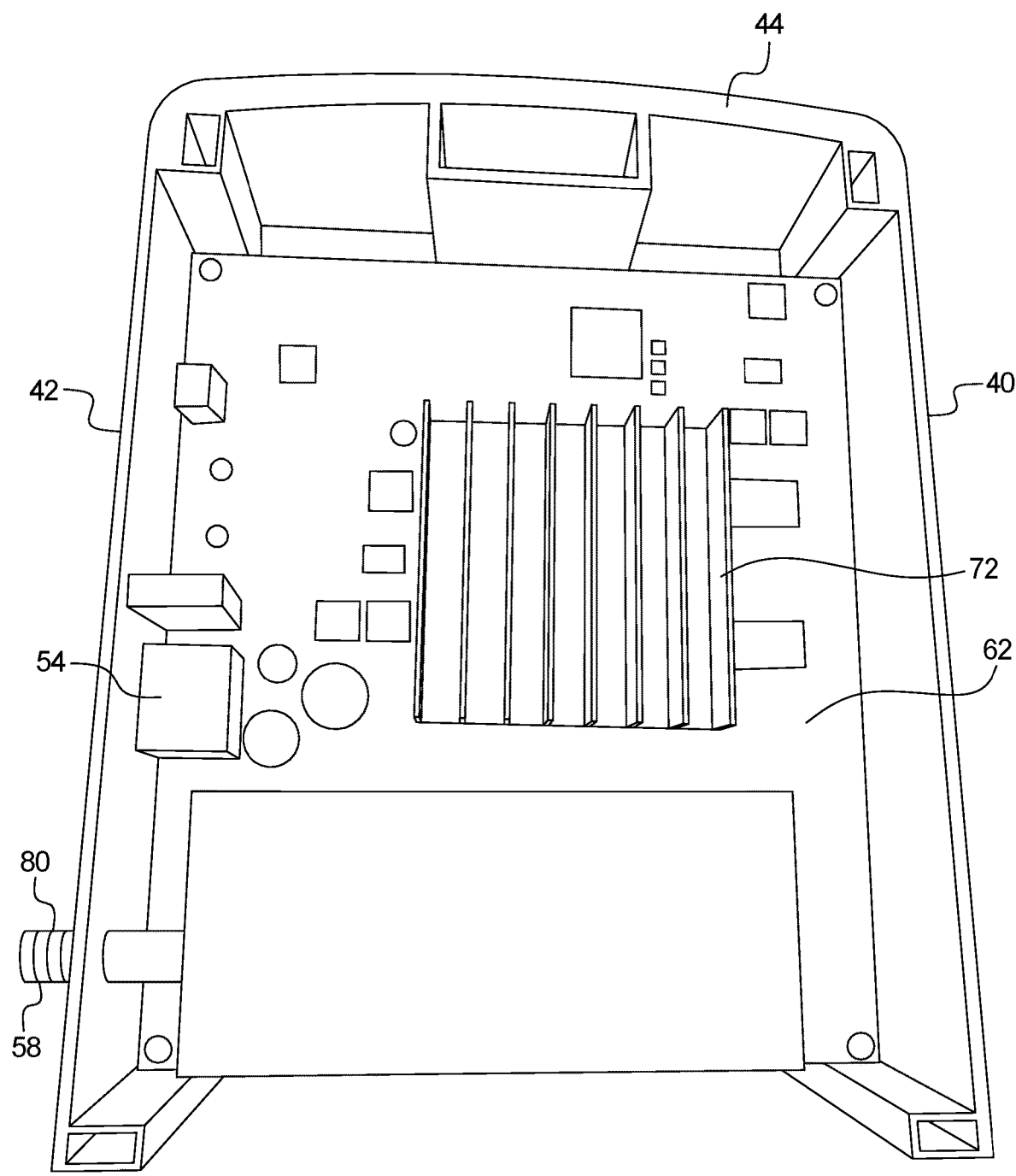
FIG. 4 is a right side view of the user terminal of FIG. 2 with the side cover removed.
Figure 5:
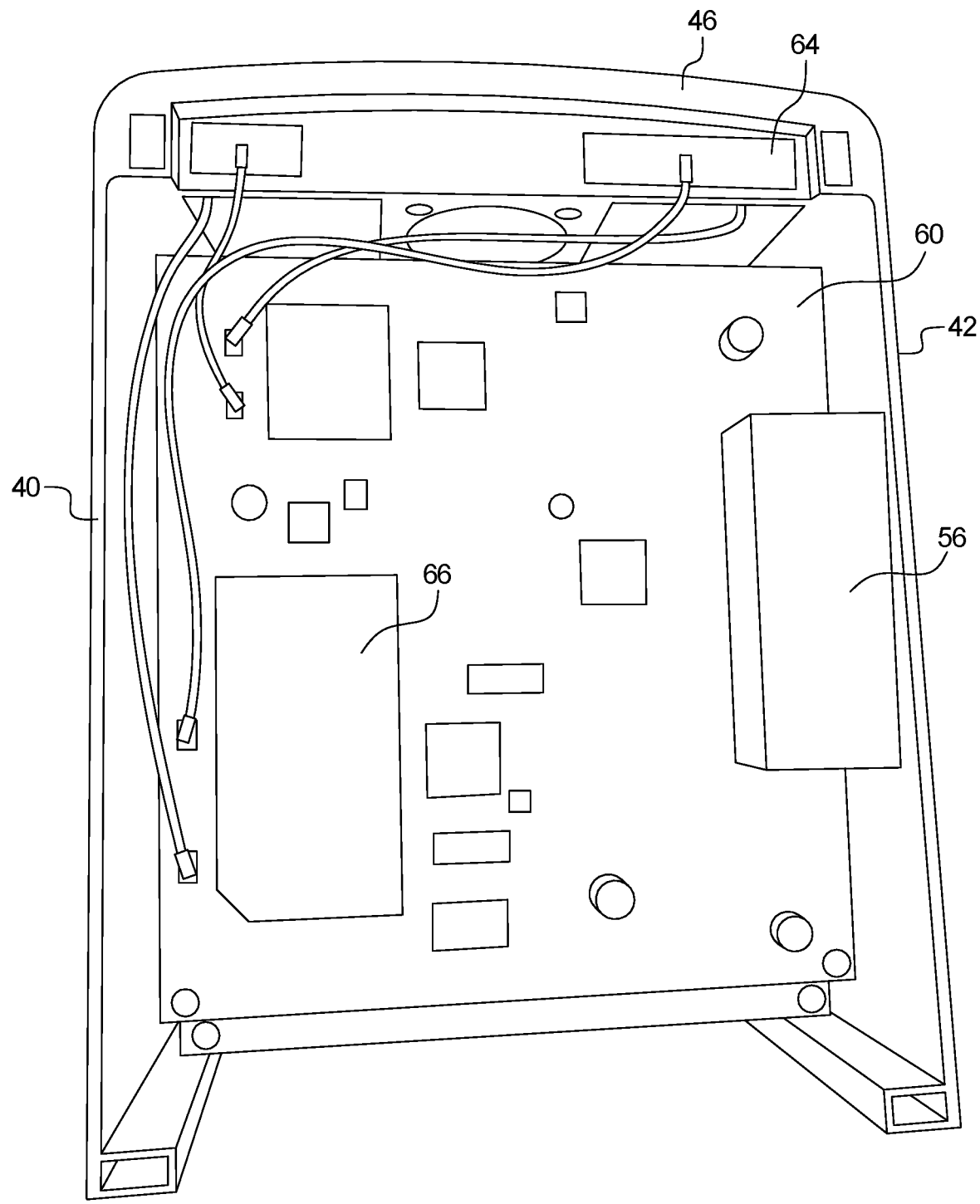
FIG. 5 is a left side view of the user terminal of FIG. 2 with the side cover removed.
Figure 6:
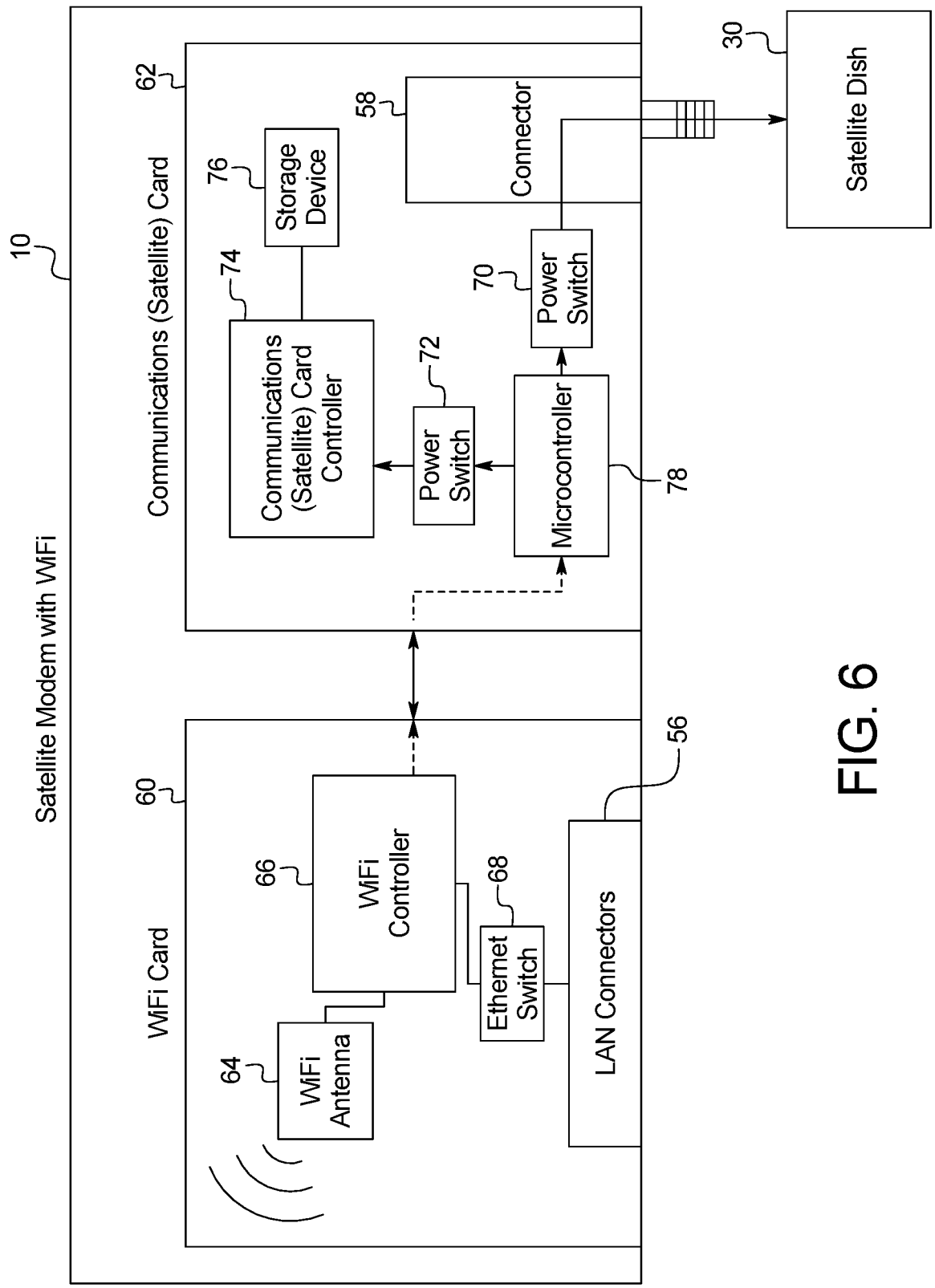
FIG. 6 is a schematic of the user terminal of FIG. 2.

As shown in FIGS. 4-6, the user terminal 10 includes a WiFi card 60 and a communications (or satellite) card 62 in communication with the WiFi card. The WiFi card includes an antenna 64, a WiFi controller 66 (a first electronic controller), an ethernet switch 68 and the LAN connectors 56. The communications card 62 includes a first power switch 70, a second power switch 72, a communications controller 74, a storage device or memory 76, a microcontroller 78 (a second electronic controller) and the connector 58.

The WiFi controller 66 preferably includes a microcomputer with a control program that controls the ethernet switch 68, the indicator lights 48, WPS button 50 and the LAN connectors 56, as discussed herein. The WiFi controller 66 can also include other conventional components such as an input interface circuit, an output interface circuit, and storage devices such as a ROM (Read Only Memory) device and a RAM (Random Access Memory) device. The microcomputer of the WiFi controller is programmed to control the ethernet switch 68, the indicator lights 48 and the LAN connectors 56. The memory circuit stores processing results and control programs such as ones for indicator light and ethernet operation that are run by the processor circuit. The WiFi controller 66 is operatively coupled to the ethernet switch 68, the indicator lights 48, WPS button 50 and the LAN connectors 56 in a conventional manner. The internal RAM of the WiFi controller 66 stores statuses of operational flags and various control data. The WiFi controller 66 is capable of selectively controlling any of the components of the WiFi Card 60 in accordance with the control program. It will be apparent to those skilled in the art from this disclosure that the precise structure and algorithms for the WiFi controller 66 can be any combination of hardware and software that will carry out the functions of the present invention.

The WiFi antenna 64 is a conventional antenna and is configured to send and receive WiFi signals from a remote device RD. The remote device RD can be any suitable device such as a terminal, a smart phone, a tablet, a computer, a television, a server, a printer, a storage device or any other suitable device. As discussed above, the antenna 64 can send and receive signals using the 802.11 standard under several distinct radio frequencies ranges for use in WiFi communications: 900 MHz, 2.4 GHz, 3.6 GHz, 4.9 GHz, 5 GHz, 5.9 GHz and 60 GHz bands. Each range can be divided into a multitude of channels. As can be understood, the WiFi antenna 64 is connected to the WiFi Controller 66 to send and receive the signals to and from the remote device RD to the WiFi controller 66.

The LAN connectors 56 (or ethernet ports) enable a remote device RD to connect to the user terminal 10 using a wired connection, i.e., an ethernet cable. The ethernet switch 68 is a central switch connecting the wired remote device RD to the user terminal 10, enabling the devices to communicate with each other, or any other device connected wirelessly or by wire, or the internet or other communication terminal to which the user terminal 10 is connected.

The microcontroller 74 of the communications card 62 is in communication with the WiFi controller 66 and receives data and information therefrom. As can be understood, the microcontroller 78 is an electronic controller that includes a control program that controls the first power switch 70 and the second power switch 72. The microcontroller 78 can also include other conventional components such as an input interface circuit, an output interface circuit, and storage devices such as a ROM (Read Only Memory) device and a RAM (Random Access Memory) device. The microcontroller 78 is operatively coupled to the first power switch 70 and the second power switch 72 in a conventional manner.

The communications controller 74 preferably includes a microcomputer with a control program that controls the communications with the satellite communication network 12 through the antenna dish 30, as discussed herein. The communications controller 74 can also include other conventional components such as an input interface circuit, an output interface circuit, and storage devices such as a ROM (Read Only Memory) device and a RAM (Random Access Memory) device. The microcomputer of the communications controller 74 is programmed to control communications with the satellite communication network 12. The memory circuit stores processing results and control programs such as ones for communications with the satellite communication network 12. The communications controller 74 is operatively coupled to the satellite dish in a conventional manner. The internal RAM of the communications controller 74 stores statuses of operational flags and various control data. The communications controller 74 is capable of selectively controlling any of the components of the satellite card in accordance with the control program. It will be apparent to those skilled in the art from this disclosure that the precise structure and algorithms for the communications controller 74 can be any combination of hardware and software that will carry out the functions of the present invention.

The user terminal can include other types of equipment (not shown) such as amplifiers, waveguides and so on as understood in the art on which enable communication between the satellite terminal 18 and one or more gateways 14 via one or more of the orbiting satellites 16.

The communications controller 74 can store, or caused to be stored, search parameters and information as discussed herein. Thus, the communications controller 74 can form a database that stores user preferred website and television information. This is information that can be stored in a storage device or memory such as storage device 76. In other words, if a specific user frequents certain websites, the communications controller can store this information for later use, as discussed in more detail below. The communications controller 74 can also store website content or cause website content to be stored for later use.

The connector 58 is a coaxial connector for direct connection to the antenna dish 30 or other suitable connection. In other words, the connector 58 can connect to a cable provider, an internet provider or any other suitable system or device. The connector 58 is generally a conventional coaxial connector with external threads 80 and an opening 82 in the end to receive coax.

Figure 7:
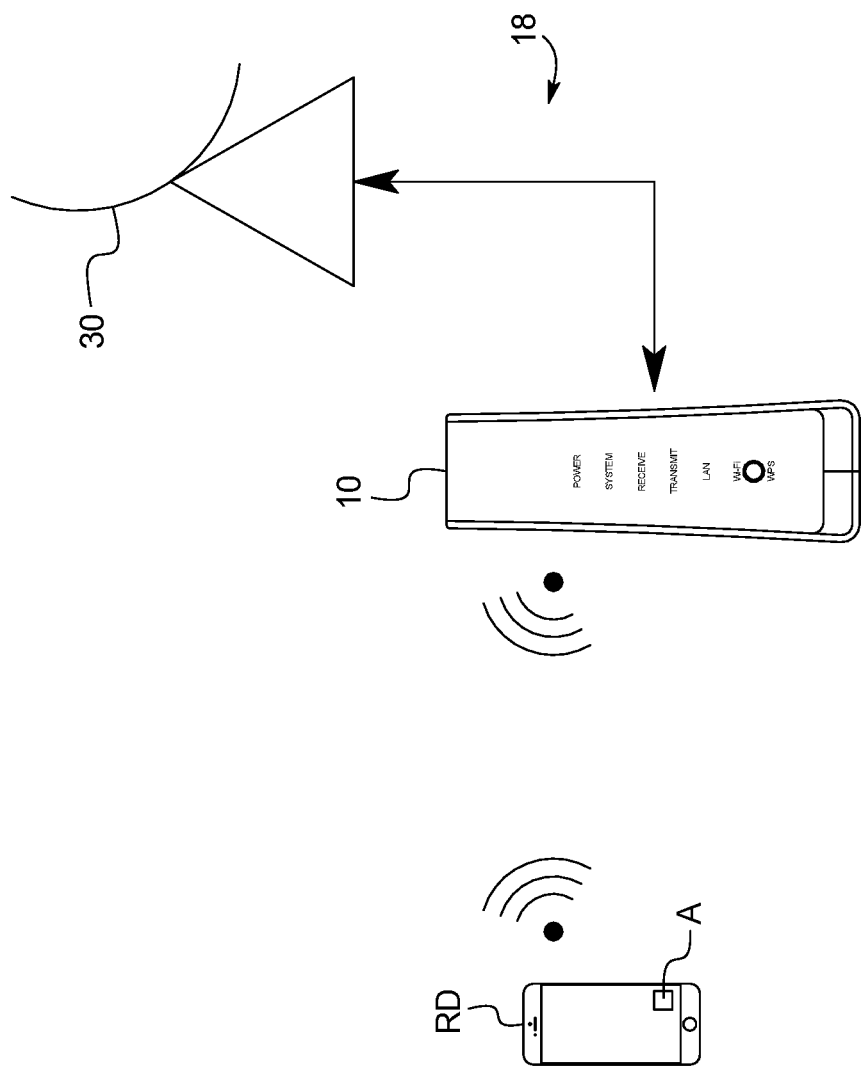
FIG. 7 is a schematic view of a communication between the user terminal of FIG. 2 and a remote device terminating communication with the satellite dish.

In the embodiment illustrated in FIG. 7, a remote device RD, such as a smart phone is in wireless communication with the user terminal 10. In this embodiment, the user of the remote device RD desires to reduce the electrical usage of the user terminal 10. As can be understood, communication between the user terminal 10 and the gateway 14 and/or antenna dish 30, in some circumstances can use more electrical power than desired or needed. In some circumstances, the user may not need to connect to the internet, or otherwise need data or information transferred to or from the gateway 14 through the satellite 16 and to or from the satellite terminal 18. Thus, in the embodiment, the user of the remote device RD accesses an app A stored on the remote device RD (or other device) to disable communication between the user terminal 10 and the satellite terminal 18 via a "one touch" disablement system. That is, the user instructs the remote device RD to send a signal over WiFi instructing the WiFi processor 66 to communicate with the microcontroller 78 to switch off communication through the connector 58. This disconnection saves power and reduces the electrical usage of the user terminal 10. Moreover, the disconnection process is simple and easy to operate and can be performed with one touch of the remote device RD.

The user may not desire connection between the user terminal 10 and the satellite terminal 18 when leaving a home or premises, during sleeping hours, or during specific inactivity. Moreover, the user may simply desire to control connection times for any additional reasons.

Figure 8:
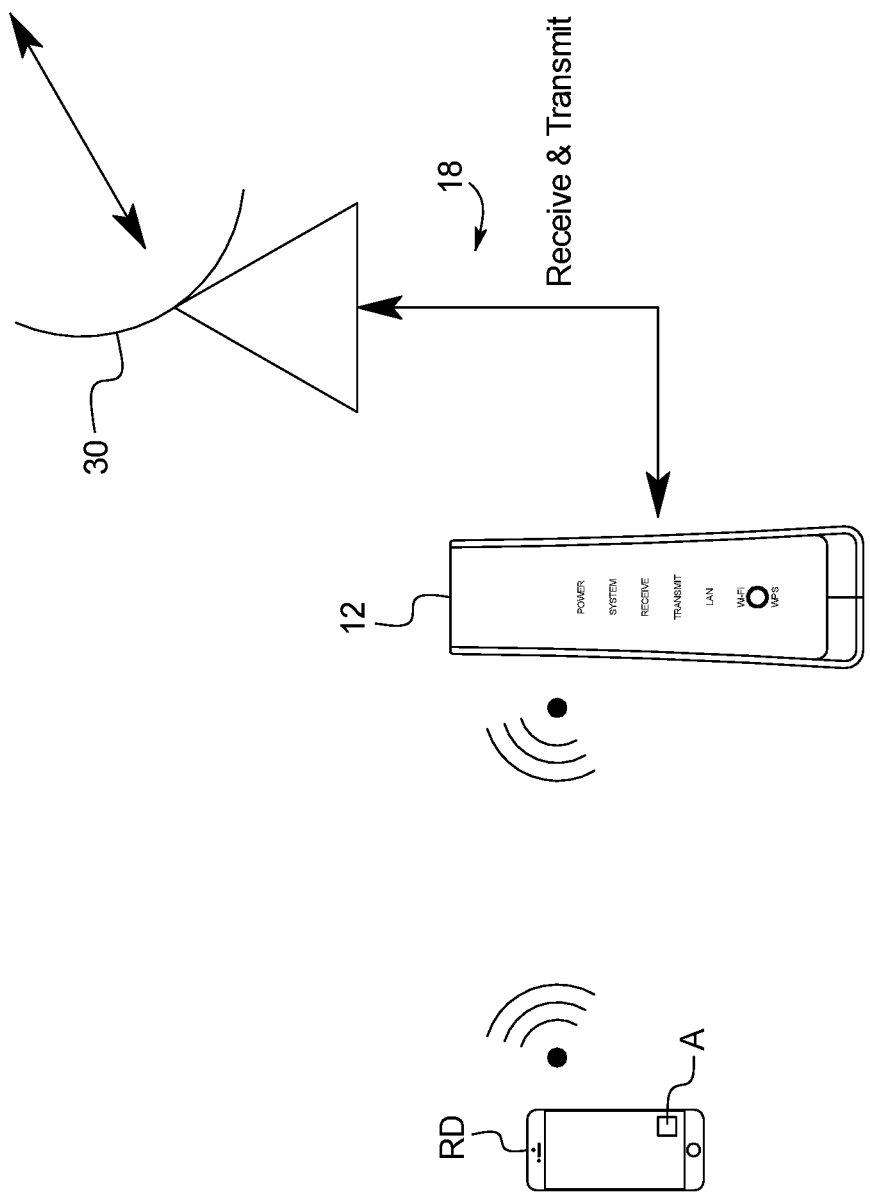
FIG. 8 is a schematic view of a communication between the user terminal of FIG. 2 and a remote device enabling communication between the user terminal and the satellite dish.

As shown in FIG. 8, the user of the remote device RD can desire to establish connection between the user terminal 10 and the antenna dish 30. In this situation, the user of the remote device RD accesses the app A stored on the remote device RD (or other device) to enable communication between the user terminal 10 and the antenna dish 30 That is, the user instructs the remote device RD to send a signal over WiFi instructing the WiFi processor 66 to communicate with the microcontroller 78 to switch on communication through the connector 58. This connection establishes the ability of the user terminal 10 to communicate with the antenna dish 30 through the connector 58. This communication allows data transfer or information to be transmitted to and from the user terminal 10, through the antenna dish 30 to and from the gateway 14 through the satellite 16. This connection disconnection process is simply and easy to operate and can be performed with one touch of the remote device RD.

Figure 9:
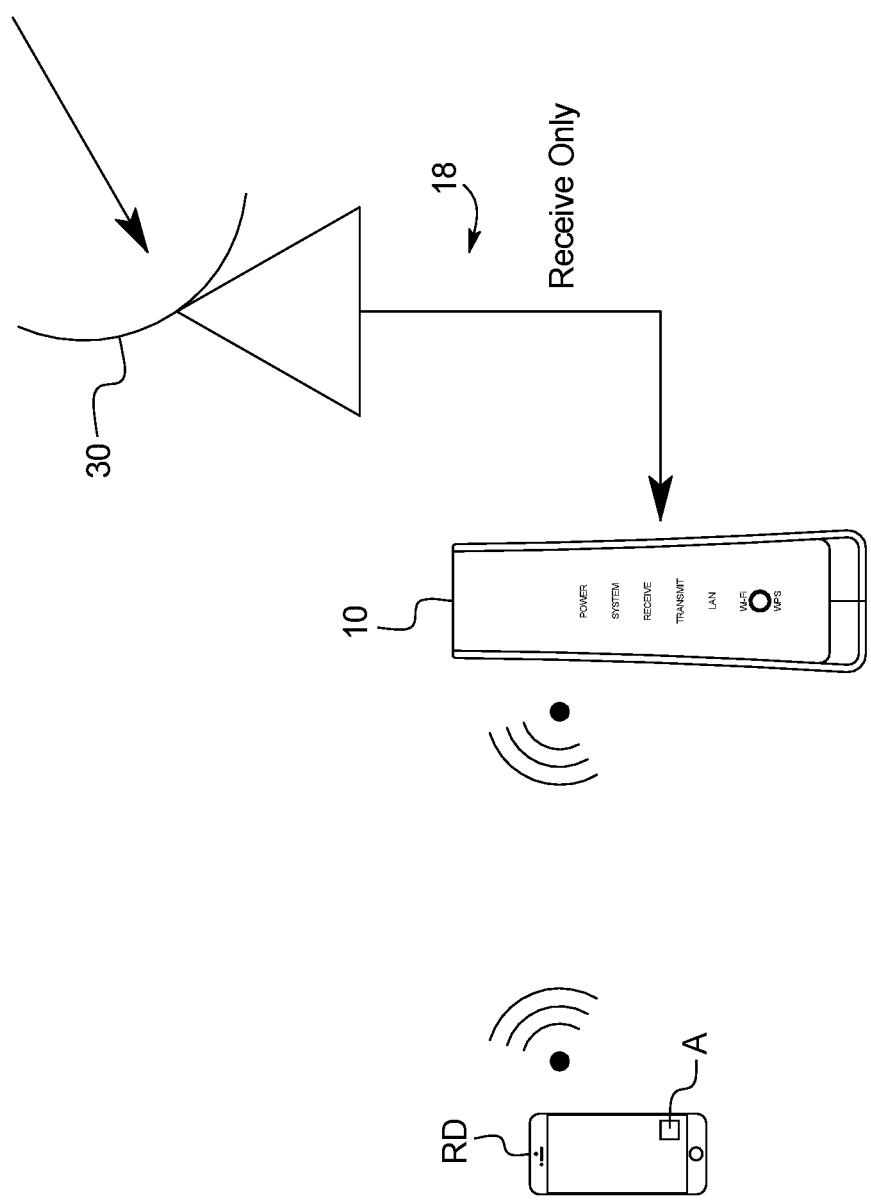
FIG. 9 is a schematic view of a communication between the user terminal of FIG. 2 and a remote device enabling only reception between the user terminal and the satellite dish.

As shown in FIG. 9, the user of the remote device RD can desire to establish connection between the user terminal 10 and the antenna dish 30. In this situation, the user of the remote device RD accesses the app A stored on the remote device RD (or other device) to enable the user terminal 10 to only receive data or information from the gateway 14. That is, the user instructs the remote device RD to send a signal over WiFi instructing the WiFi processor 66 to communicate with the microcontroller 78 to switch on communication through the connector 58 such that the user terminal 10 can only receive data or information and is not capable of sending data or information through the satellite communication network 12. This connection establishes the ability of the user terminal 10 to download information through the antenna dish 30 from the gateway 14 through the satellite 16. This reduction of operation saves power and reduces the electrical usage of the user terminal 10. Moreover, the process is simple and easy to operate and can be performed with one touch of the remote device RD.

Figure 10:
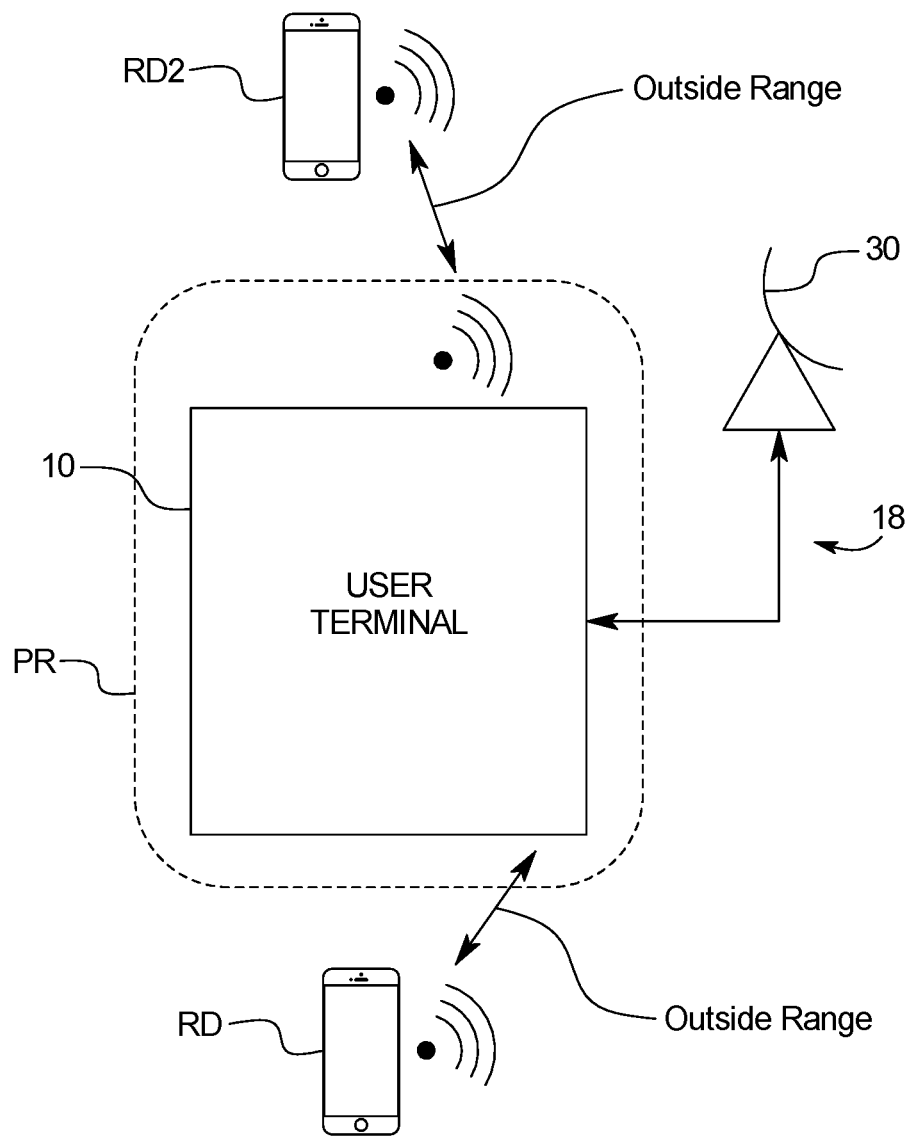
FIG. 10 is a schematic view of a communication between the user terminal of FIG. 2 and a plurality of remote devices illustrating termination of communication between the user terminal and the satellite dish.
Figure 11:
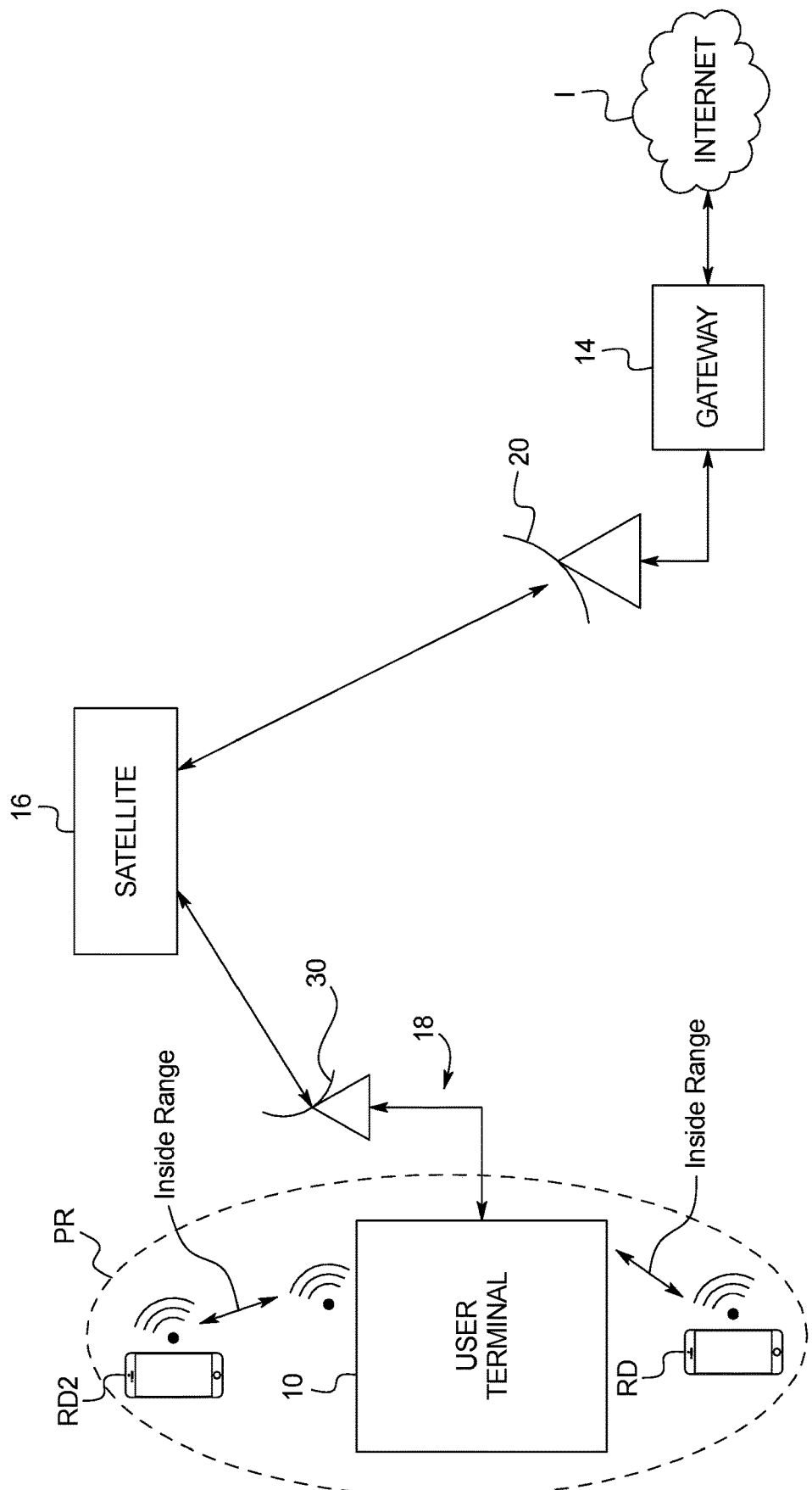
FIG. 11 is a schematic view of a communication between the user terminal of FIG. 2 and a plurality of remote devices illustrating enabling communication between the user terminal and the satellite dish.

FIG. 10 illustrates an embodiment in which the user terminal 10 can detect whether a remote device RD is within or outside a predetermined range PR or alternatively whether the remote device RD has been inactive for a predetermined amount of time. The predetermined range PR or time can be any suitable range set or time or can simply be any detection of the remote device RD. For example, the remote device RD may travel with the user, and when the user returns, the user terminal 10 detects that the remote device RD has returned, as shown in FIG. 11. Alternatively, the user may not operate the remote device RD or deactivate the remote device RD, such that the user terminal 10 does not receive an active signal for a predetermined amount of time.

Thus, the microcontroller 78 is programmed to disable communications to and from the gateway 14 when the remote device RD is not within the predetermined range PR or active for a predetermined amount of time and to enable communications to and from the gateway 14 when the remote device RD is within the predetermined range or becomes active.

Moreover, as illustrated in FIG. 10, the user terminal 10 can communicate with a plurality of remote devices—e.g., a first remote device RD and a second remote device RD2; however, it is note that the user terminal 10 can communicate with any number of suitable remote devices. Thus, when communicating with a plurality of remote devices, the user terminal 10 can disable or enable communication with the gateway 14 when all of the remote devices are not within or within the predetermined range. Alternatively, when communicating with a plurality of remote devices, the user terminal 10 can disable or enable communication with the gateway 14 when one or some of the plurality of remote devices are not within or within the predetermined range or have been inactive for a predetermined amount of time.

Accordingly, FIG. 10 illustrates a situation in which the user terminal 10 has been disabled (or powered down) to conserve energy until the remote devices RD, RD2 come within range of the user terminal 10 or have been reactivated. As shown in FIG. 11, once at least one of the remote devices RD comes within the predetermined range PR or is activated within the predetermined range PR, the WiFi signal from the remote device RD is received by the WiFi antenna 64 which transmits this signal to the WiFi controller 66. The WiFi controller 66 then communicates with the microcontroller 78, which instructs the first switch 70 to enable communications with the antenna dish 30.

Figure 12:
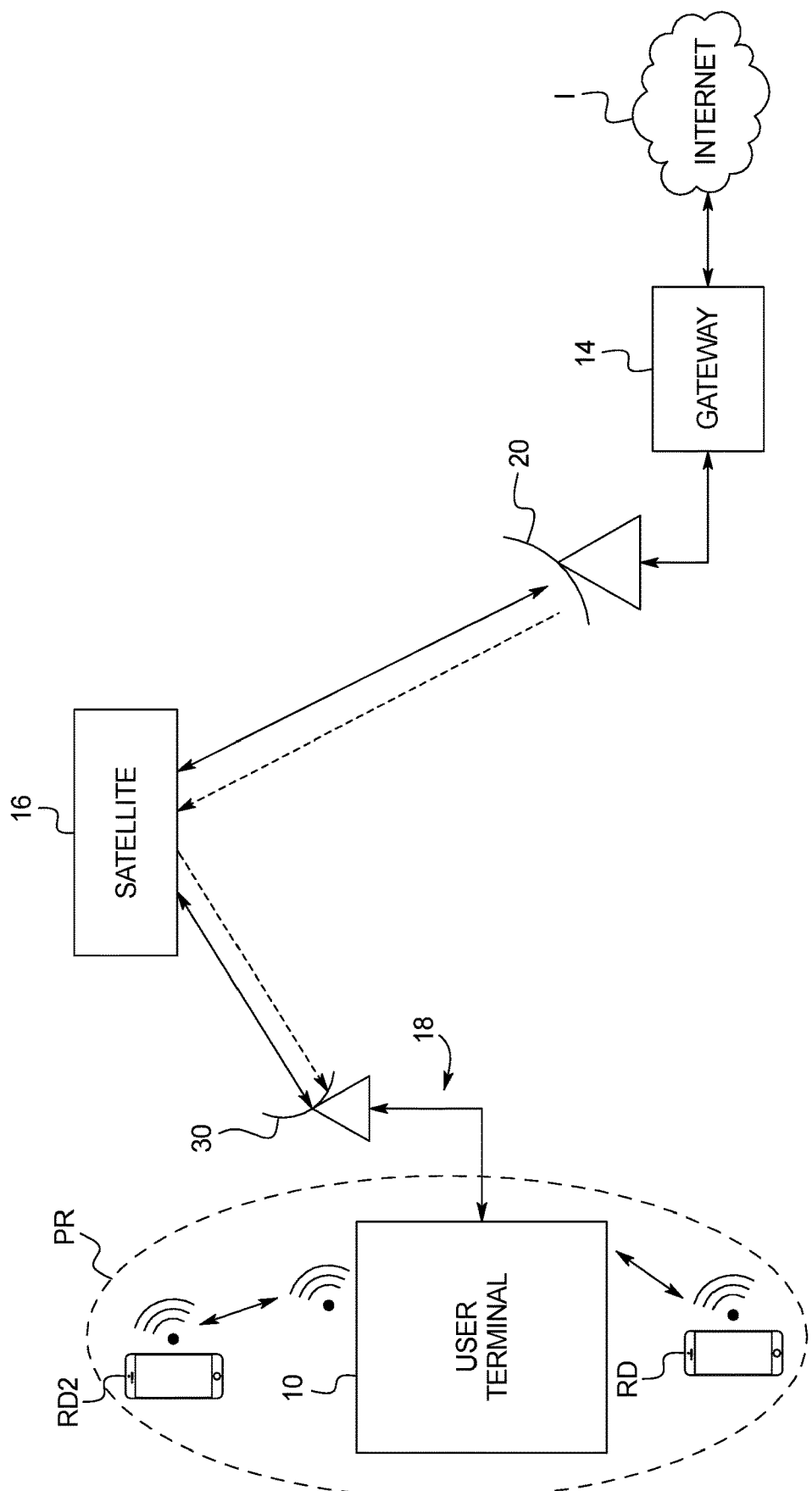
FIG. 12 is schematic view of a communication between the user terminal of FIG. 2 and a plurality of remote devices illustrating content download to a storage device in the user terminal.

As shown in FIG. 11, communications are then established through the satellite 16 to the gateway 14. In other words, information can now be transferred from the internet I (or cloud or any other device or system) through the gateway 14 though the satellite 16 to the antenna dish 30. Thus, as shown in FIG. 12, the satellite terminal 18 can now receive a multi-cast broadcast or any other data or information, as discussed herein.

Such a system can increase the speed of the system as perceived by the user. For example, the user can indicate that certain website content or data is desired to be viewed or, as discussed above, the controller can analyze the information in the database and identify websites that meet a popularity condition based on information pertaining to requests for access to website data present at the website. Thus, when the remote device RD enters the predetermined range PR or is activated within the predetermined range PR of the user terminal 10, the user terminal 10 can establish communications with the gateway 14 and request to be included in multi-cast broadcasts or other specific data or information.

In the examples discussed herein, the term "popularity condition" generally refers to an indication of the popularity of a website, or the popularity of specific content on a website or content accessible via a link on a website. For instance, the term "popularity condition" can refer to a number of requests for a particular website or for content on that particular website, or content that is accessible via a particular link on that particular website or a particular television show or genre of television shows. "Popularity condition" can refer to a number of requests from a specific user or household to a user terminal 10 or can refer to the number of requests from a plurality of satellite terminals 18. The term "popularity condition" can also refer to certain known popular websites, such as popular news websites (e.g., CNN, MSNBC, FOX and so on), popular sports websites (e.g., ESPN), popular weather websites (e.g., the Weather Channel) and so on. The term "popularity condition" can further refer to websites for which individual users, households or satellite terminals 18 have requested periodic updates of the contents of those websites via, for example, a GUI or in any other suitable manner and/or have viewed through television.

Thus, in one embodiment, the communications controller 74 can identify websites or television shows for which the most requests by the user or the household. The communications controller 74 then requests the gateway 14 retrieve from the respective content providers the website content of those websites or television shows which the communications controller 74 identifies as meeting the desired popularity condition. For instance, the gateway 14 can retrieve the website content or television shows of the respective websites or television shows that have received a respective number of requests at least equal to a predetermined threshold. The communications controller 74 can, in addition or alternatively, cause the gateway 14 to retrieve the website content of the respective known popular websites or television shows. Furthermore, the communications controller 74 can, in addition or alternatively, cause the gateway 14 to retrieve the website content of the respective websites for which periodic updates have been requested from specific satellite terminals 18.

The communications controller 74 can also request the gateway 14 retrieve from the respective content providers link accessible data that is otherwise retrieved via a weblink at a website meeting the desired popularity condition. Since it is common for a website to include links to information which may be of further interest, the communications controller 74 can analyze the information in a database to determine which of the links on a website meeting the desired popularity condition link to content that also meets the desired popularity condition.

For example, a popular sports website may include several links such as a link to the latest major league baseball scores, a link to breaking sports news, and other specialized links. Upon determining that the content which is accessible via any or all of these links meets the desired popularity condition, the communications controller 74 requests that the gateway 14 retrieve that link accessible data from the respective content providers. For example, if the communications controller 74 determines that users click on links to the latest major league baseball scores and are thus requesting that content, the communications controller 74 will request the gateway 14 retrieve that link accessible data pertaining to the latest major league baseball scores from the respective content providers. Likewise, if the communications controller 74 determines that user or household is clicking on the link to the breaking sports news and are thus requesting that content, the communications controller 74 will request the gateway 14 retrieve that link accessible data pertaining to the breaking sports news from the respective content providers. The communications controller 74 will thus combine the link accessible data with the website data to create respective website content data for each respective website that meets the desired popularity condition. Therefore, each website content data includes not only the content present on the website, but content that is accessible via a link or links on that website.

The communications controller 74 can further request that the gateway include encryption information in any or all of the website content data to restrict access to any or all of the website content data. For example, if certain streaming content, such as particular movie or television program, or any other type of third-party applications, software, data, multimedia and so on, is receiving many requests, the website and/or link to the streaming content may meet the popularity condition. However, the streaming content may be a pay-per-view type movie or program.

Therefore, in each of these situations, the communications controller 74 will request that the gateway 14 retrieve the entirety of the streaming content from the content provider, create website content data including the entirety of the streaming content, and store that website content data in the storage device 76 with the appropriate related information. The gateway 14 can also encrypt that particular website content data to make that website content data inaccessible without a decryption key. Thus, only authorized users are permitted to access the encrypted website content data.

Moreover, as stated above, the user terminal 10 can enable communications with the gateway 14 thus enabling reception of multi-cast broadcast. A multi-cast broadcast occurs, when a gateway 14 analyzes a database of a plurality of satellite terminals 18, identifies those websites for which the most requests have been received by the gateway from satellite terminals 18.

Similar to as described above, the gateway 14 retrieves from the respective the content providers the website content of those websites which the gateway 14 identifies as meeting the desired popularity condition. For instance, the gateway 14 can retrieve the website content of the respective websites that have received a respective number of requests at least equal to a predetermined threshold. The gateway 14 can, in addition or alternatively, retrieve the website content of the respective known popular websites. Furthermore, the gateway 14 can, in addition or alternatively, retrieve the website content of the respective websites for which periodic updates have been requested from specific satellite terminals 18.

The gateway 14 retrieves from the respective content providers link accessible data that is otherwise retrieved via a weblink at a website meeting the desired popularity condition. Since it is common for a website to include links to information which may be of further interest, the gateway 14 analyzes the information in the database to determine which of the links on a website meeting the desired popularity condition link to content that also meets the desired popularity condition.

The gateway 14 can then broadcast the data to a plurality of satellite terminals 18. For a more detailed discussion of multi-cast broadcast, please see U.S. Patent Application Publication No. 2017/0300967, titled Satellite-Based Communication Network for Reducing Bandwidth use and Communication Latency, the contents of which are herein incorporated by reference.

Once the content is downloaded to the satellite terminal 18, the content or data can be saved in the storage device 76 for viewing by the user. In other words, as shown in FIGS. 10-12, when the remote device RD enters the predetermined range PR of the user terminal 10, the microcontroller 78 enables communications through the satellite terminal 18. The desired content is then downloaded into the storage device 76 through the satellite communication network 12 for viewing by the user.

Figure 13A:
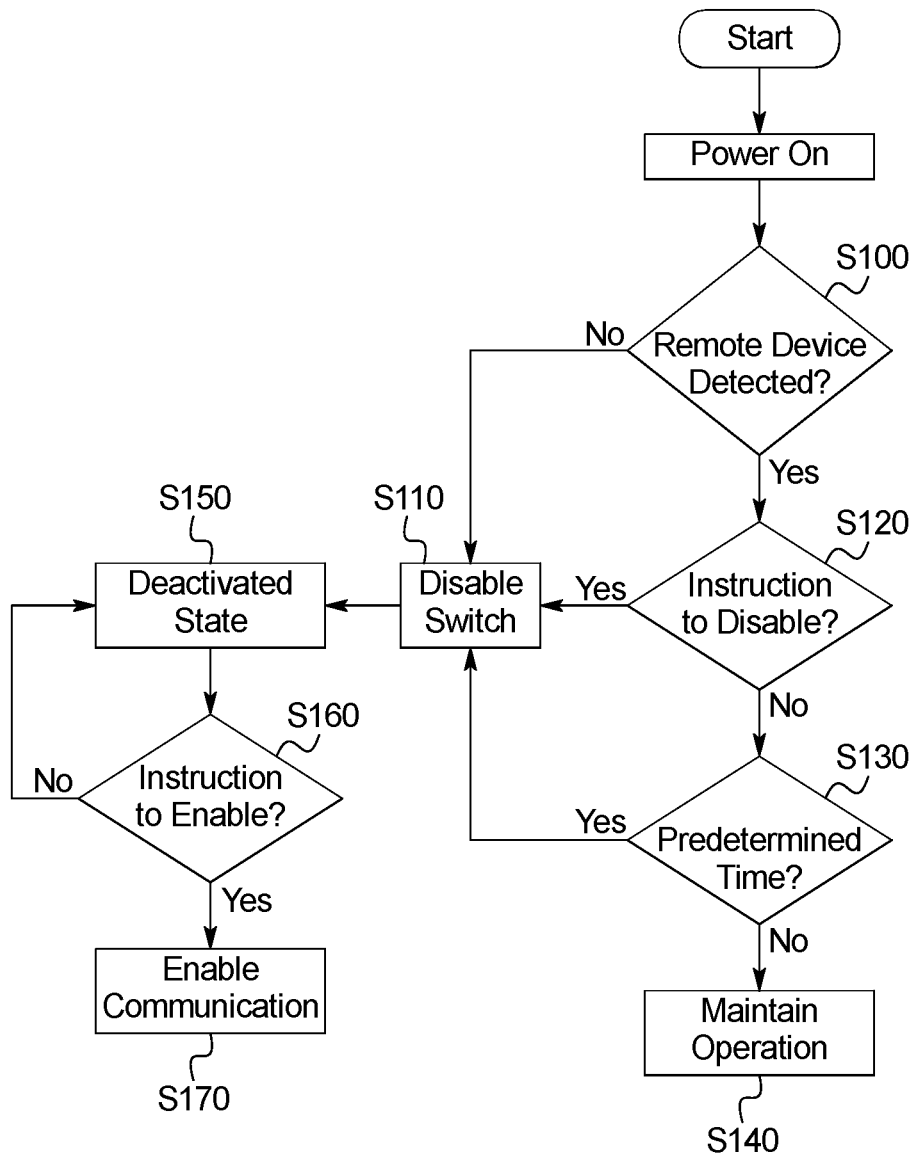
FIG. 13A is a flow chart illustrating the operation of one aspect of the user terminal and a remote device.

Turning to the flow chart shown in FIG. 13A, the method of operation of the user terminal 10 with the power switch 70 in the on position to enable communication with the gateway 14 will now be discussed. In step S100, the user terminal 10 determines whether the remote device RD is detected within the predetermined range PR. If the remote device RD is not detected, the microcontroller 78 operates the power switch 70 to disable communication with the gateway 14 in step S110. If the remote device 72 is detected, the user terminal 10 determines whether there is an instruction from the remote device RD to operate the power switches 70 and/or 72 to disable communication with the antenna dish 30 in step S120. If there is an instruction to disable communication with the gateway 14, the microcontroller 78 operates the power switch 70 to disable communication with the gateway 14 in step S110. If there is no instruction to disable communication with the gateway 15, the user terminal 10 determines whether a predetermined time of no use of the remote device RD has elapsed in step S130. If a predetermined time of no use of the remote device RD has elapsed, microcontroller 78 operates the power switches 70 and/or 72 to disable communication with the gateway 14 in step S110. If the predetermined time of no use of the remote device RD has not elapsed, the user terminal 10 maintains communication with the gateway 14 in step S140.

In step S160, when the user terminal 10 is in the disabled position (deactivation state S150), the user terminal 10 determines whether there is an instruction to operate the microcontroller 78 to enable communication with the gateway 14. If there is no instruction to operate the microcontroller 78 to enable communication with the gateway 14, the user terminal 10 maintains a deactivated state in step S150. However, if there is an instruction to operate the microcontroller 78 to enable communication with the gateway 14, the microcontroller 78 operates the power switches 70 and/or 72 to enable communication with the gateway 14 in step S170.

Figure 13B:
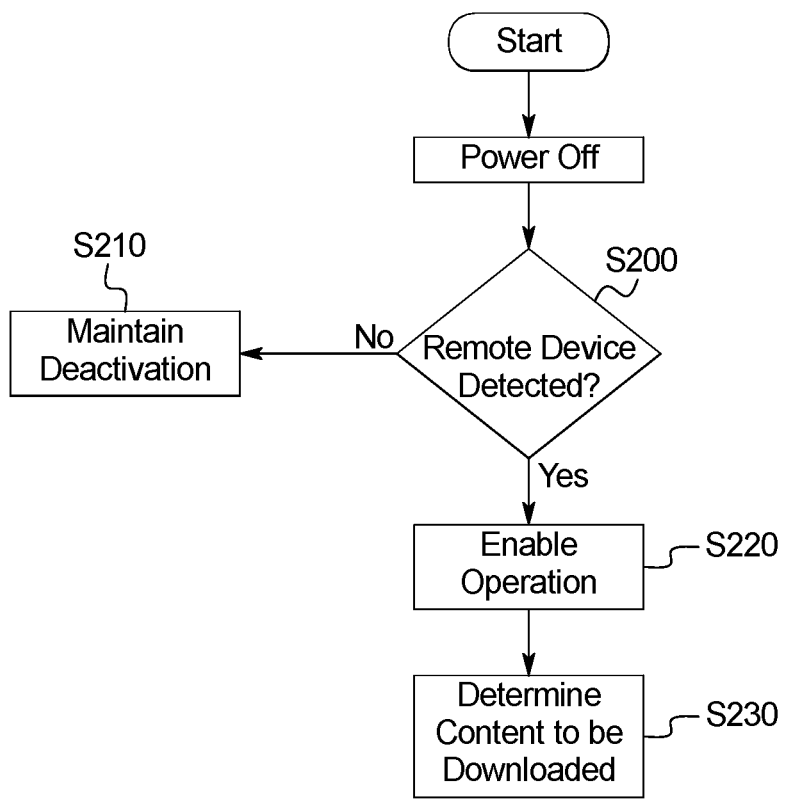
FIG. 13B is a flow chart illustrating the operation of another aspect of the user terminal and a remote device.

Turning to the flow chart shown in FIG. 13B, the method of operation with the power switches 70 and/or 72 in the off position to disable communication with the gateway 14 will now be discussed. In step S200, the user terminal 10 determines whether the remote device RD is detected. If the remote device RD is not detected or is not within range, the user terminal 10 maintains a deactivated state in step S210. However, if the remote device RD is detected or is within the predetermined range PR, the microcontroller 78 operates the power switches 70 and/or 72 to enable communication with the gateway 14 in step S220. In step S203, the communications controller 74 determines, what content, if any, is desired to be downloaded based on the remote device RD. The user terminal 10 downloads the desired content and stores in the storage device 76.

The embodiments of the user terminal described herein disclose a user terminal having software and hardware capable of entering a power savings mode and has an intelligent wake system. Such a system has advantages over the cited art in that it is capable of saving energy. Additionally, the user terminal reduces download wait time for users and improves user experience with the user terminal and satellite communication network. In particular, when a specific user, based on a specific remote device RD, is detected by the user terminal 10, the user terminal 10 can establish communications with the gateway 14. The gateway 14 can then retrieve content or information requested by the user or identified as desirable by the user or the based on a popularity condition and download the content to the user terminal. Thus, the content is stored in the storage device 76 for viewing by the user.

General Interpretation of Terms

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts. Accordingly, these terms, as utilized to describe the present invention should be interpreted relative to a User terminal Power Savings and Intelligent Wake System.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A user terminal, comprising:
    a WiFi card including a first electronic controller, an antenna in communication with the first electronic controller, the antenna of the WiFi card configured to receive a signal from a remote device; and
    a communications card including a second electronic controller, a connector configured to connect to an external communications device, and a power switch in communication with the second electronic controller and the connector, the second electronic controller configured to control the power switch to enable or disable power that is supplied to the external communication device for driving the external communication device through the connector upon receiving instructions from the first electronic controller, based on the signal received by the antenna of the WiFi card.

2. The user terminal of claim 1, wherein
    the antenna of the WiFi card is configured to receive the signal from the remote device including instructions for the second electronic controller to disable power through the connector.

3. The user terminal of claim 1, wherein
    the antenna of the WiFi card is configured to receive the signal from the remote device including instructions for the second electronic controller to enable power through the connector.

4. The user terminal of claim 1, wherein
    the communications card is a satellite card.

5. The user terminal of claim 1, wherein
    the antenna of the WiFi card is configured to receive the signal from the remote device indicating the remote device is within a predetermined range, and upon determining that the remote device is not within the predetermined range, the first electronic controller is configured to instruct the second electronic controller to disable power through the connector.

6. The user terminal of claim 1, wherein
    the antenna of the WiFi card is configured to receive the signal from the remote device indicating the remote device is within a predetermined range, and upon receiving the signal from the remote device, the first electronic controller is configured to instruct the second electronic controller to enable power through the connector.

7. The user terminal of claim 6, wherein
    after enabling power through the connector, the communications card is configured to download predetermined information through the connector, and save the downloaded predetermined information to a storage device.

8. The user terminal of claim 1, wherein
    the connector is configured to connect to a satellite dish.

9. A method of reducing power consumption of a user terminal, comprising:
    receiving a signal with an antenna of a WiFi card;
    transmitting the signal to a first electronic controller of the WiFi card;
    transmitting the signal from the first electronic controller to a second electronic controller of a communications card; and
    instructing a power switch of the communications card, via the second electronic controller to disable or enable power that is supplied to an external communication device for driving the external communication device through a connector configured to connect to the external communications device, upon receiving instructions from the second electronic controller.

10. The method of claim 9, wherein
    the receiving the signal with the antenna of the WiFi card includes receiving the signal from a remote device instructing the second electronic controller to disable power through the connector.

11. The method of claim 9, wherein
    the receiving the signal with the antenna of the WiFi card includes receiving the signal from a remote device instructing the second electronic controller to enable power through the connector.

12. The method of claim 9, wherein
    the communications card is a satellite card.

13. The method of claim 9, wherein
    the receiving the signal with the antenna of the WiFi card includes receiving the signal from the remote device indicating the remote device is within a predetermined range, and upon determining that the remote device is not within the predetermined range, the first electronic controller instructs the second electronic controller to disable power through the connector.

14. The method of claim 9, wherein
    the receiving the signal with the antenna of the WiFi card includes receiving the signal from the remote device indicating the remote device is within a predetermined range, and upon determining that the remote device is not within the predetermined range, the first electronic controller instructs the second electronic controller to enable power through the connector.

15. The method of claim 14, further comprising after enabling power through the connector, downloading predetermined information, via the communications card, through the connector, and saving the downloaded predetermined information to a storage device.

16. The method of claim 9, further comprising connecting the connector to a satellite dish.

* * * * *